(12) United States Patent
Gao et al.

(10) Patent No.: US 10,595,452 B2
(45) Date of Patent: Mar. 24, 2020

(54) OBLIQUE SUBMERGED REVERSE DEEP ROTARY TILLAGE DEVICE

(71) Applicant: JIANGSU UNIVERSITY, Jiangsu (CN)

(72) Inventors: Jianmin Gao, Jiangsu (CN); Huidong Qi, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 15/744,973

(22) PCT Filed: Aug. 12, 2016

(86) PCT No.: PCT/CN2016/094821
§ 371 (c)(1),
(2) Date: Jan. 15, 2018

(87) PCT Pub. No.: WO2018/018667
PCT Pub. Date: Feb. 1, 2018

(65) Prior Publication Data
US 2019/0133017 A1    May 9, 2019

(30) Foreign Application Priority Data

Jul. 28, 2016  (CN) .......................... 2016 1 0608872

(51) Int. Cl.
*A01B 33/02*    (2006.01)
*A01B 33/06*    (2006.01)
*A01B 33/14*    (2006.01)

(52) U.S. Cl.
CPC .............. *A01B 33/06* (2013.01); *A01B 33/02* (2013.01); *A01B 33/142* (2013.01); *A01B 33/146* (2013.01)

(58) Field of Classification Search
CPC ... A01B 9/00; A01B 9/003; A01B 33/00–025; A01B 33/10; A01B 33/103; A01B 33/16
See application file for complete search history.

(56) References Cited

U.S. PATENT DOCUMENTS 2,601,818 A * 7/1952 Zwemke ................ A01B 33/00
                                                         172/74
4,564,073 A * 1/1986 Ide .......................... A01B 15/14
                                                         172/120
(Continued)

FOREIGN PATENT DOCUMENTS

CN          2075409        4/1991
CN          105284206      2/2016
(Continued)

*Primary Examiner* — Matthew Troutman
(74) *Attorney, Agent, or Firm* — Hartman Global IP Law; Gary M. Hartman; Domenica N. S. Hartman

(57) ABSTRACT

An oblique submerged reverse deep rotary tilling device configured to be connected to a tractor. The tilling device includes a stander, a mounted frame, a gearbox and an oblique blade roller. The oblique blade roller has configured rotary blades whose tips bend to the same direction. The angle between the rotary tilling blade roller and an advancing direction of the tractor is 55~70° while the rotary blade tips are all toward the right side of the advancing direction. Side force balance blades are installed to the left side of the oblique blade roller, rotate in a plane that is parallel to the advancing direction, and have a rotating center axis disposed at an angle to the oblique blade roller to balance the axial component force of the oblique blade roller.

9 Claims, 5 Drawing Sheets

(56) References Cited

U.S. PATENT DOCUMENTS

| | | | | |
|---|---|---|---|---|
| 5,070,946 A | * | 12/1991 | Herr | A01B 43/005 |
| | | | | 171/65 |
| 5,097,908 A | * | 3/1992 | Kirch | A01B 9/00 |
| | | | | 172/123 |
| 9,888,621 B2 | * | 2/2018 | Wehler | A01B 33/021 |
| 2018/0020606 A1 | * | 1/2018 | Baraldi | A01B 33/021 |
| | | | | 172/772 |

FOREIGN PATENT DOCUMENTS

| | | |
|---|---|---|
| CN | 105794344 | 7/2016 |
| FR | 3028135 | 5/2016 |
| JP | 2005318819 | 11/2005 |
| JP | 2010172302 | 8/2010 |

* cited by examiner

OBLIQUE SUBMERGED REVERSE DEEP ROTARY TILLAGE DEVICE

I. TECHNICAL FIELD

The present invention relates to a rotary tiller device adapted for use for the plowing or tilling the soil, grading or leveling the ground, weeding, etc., and particularly concerned with the type of device in which oblique submerged reverse deep rotary tillage is used.

II. BACKGROUND ART

Soil tillage is a heavy-duty work and consumes a lot of energy. At present, plowing and rotary tillage are two main ways of soil tillage. By cutting soil orderly, plowing has good tillage performance and meets the demands for deep tillage. However, in order to meet the agronomic requirements, the plowed soil needs to be more harrowed, so, the tilling process is complicated, inefficient, energy-consuming and costly. Rotary tillers have both functions of plowing and harrowing. Meanwhile, it can till stubble, weeds, and green manure crops. Additionally, the tilled land remains level, and furrow slices are fragmented enough after rotary tilling. Therefore, rotary tilling can meet the agronomic requirements and race against tillage time. However, rotary tillage needs more energy, and its performance coverage is relatively poorer compared to plow tillage. So, it can make many plants on the topsoil and let weeds sprout earlier. With the rapid development of agricultural technology, cultivation techniques are also used in rhizome crop cultivation. In order to improve the quality and yield of rhizome crops, the quality of the cultivated soil is required more critically. Namely, tillage should increase the depth of tillage and make the soil looser. In order to meet the requirements of thickening soil maturation layer, improving soil aeration, increasing the water capacity and making more straws returned to the field, it is one of the leading research directions to increase the tillage depth, reduce energy consumption and improve tilling quality.

Currently, natural rotary tillage must increase the diameter of knife roller to increase the tillage depth because the knife shaft is located above the soil surface.

However, the large diameter of the knife roller will make the whole structure bulky and heavy, and the power consumption will increase sharply. According to current rotary tiller design theory, the soil cutting process starts when rotary blades below the rotary blade cutter center horizontal line and finishes to the rotary blade to the vertical position. However, when $H=R\times(1-1/\lambda)$, (Where R is the revolution radius, H is tillage depth, and $\lambda$ is rotational speed ratio of rotary tillage. The level trail of the instantaneous rotational center of cutter falls on the ground, and the speed direction of the sidelong edge of the rotary blade is vertical downward. Meanwhile, rotary tilling blades have the minimum dynamic cutting angle, and the resistance of cutting soil is small. The target tilling depth H is determined depending on the agronomic requirements, and cutter radius R is decided by $R \geq H \times \lambda(\lambda-1)$. Usually, $\lambda$ (the value of rotational speed ratio of rotary tillage) is between 4~10. In order to improve the harrow breaking rate, lower gully bottom roughness, and ensure a reasonable dynamic gap angle, the value of $\lambda$ should take a larger value. In this way, the value of R is relatively small, and consequently, the rotary cultivator has the advantages of compact structure, but the power consumption will increase sharply with the tilling depth increasing. Meanwhile, the cutting soil resistance force direction of the knife cylinder points to the front top, and its vertical component force points upward, which will not be helpful for rotary tilling blades piercing soil. Especially, the blade back will squeeze soil when travel speed increase and leading rotary tillers to bump which influences the stability of tilling depth. If the horizontal resistance force of the knife roller is bigger than tractor rolling resistance and other horizontal resistances, the tractor will be pushed to slip in the process of cutting soil, and parasitic power will be generated. It will lead tractor driving system to be destroyed, increase tractor power consumption and lower tractor effective life.

The submerged reverse rotary tillage is a rotary tillage model of the rotary cutter shaft sinking below the surface. Because the rotation direction of rotary blade is averse to the rotation direction of the driving wheel of the tractor, submerged reverse rotary tillers cut soil clods from the bottom of the furrow, and more soil clods are broken by tension. So, submerged reverse rotary tillage can reduce the cutting resistance force, cutting torque, and soil crushing energy consumption. In addition, since the cutter shaft is below the soil surface, the submerged reverse rotary tillage can be achieved deep tillage by using a short blade. But the submerged reverse rotary tillage makes so many soil clods be thrown to the front of rotary tiller blade rollers and leading hipping. The phenomenon of hipping will cause re-tillage, and make the working load and power consumption increase rapidly. The rotary tillers will not able work if the hipping is very serious. Furthermore, in order to make the cutter shaft sink below the surface, we must design special part to avoid gearbox and bearing seat interfering with the uncultivated land. This will make the rotary tillers more complicated and lower transmission efficiency.

III. CONTENTS OF THE INVENTION

In the view of shortcomings of existed rotary tillers, it is an object of present invention to discloses about a rotary tilling device with easier manufacturing properties, and more particularly it relates to an oblique submerged reverse deep rotary tilling device. The further object of this invention is to till soil regularly at high speed, makes more soil destroy by pulling force, and changes the trail of throwing soil clods. It is a still further object of the present invention to reduce re-tillage and power consumption significantly and increase tillage depth.

According to the present invention the oblique submerged reverse deep rotary tilling, as stated above, the device mainly comprises a stander, a mounted frame, a gearbox and an oblique blade roller. This device has characters as follows: the gearbox is configured at the center of the stander; the power input shaft of the gearbox is linked with the power take-off (PTO) shaft of the tractor by a universal joint, and the angle between the power input shaft and the tractor advancing direction (V) is 110~125°; the power output shaft of the gearbox is a splined shaft, further, the ends of the power output shaft are connected with corresponding adjacent ends of the oblique blade roller shaft and equipped in the bearing of the bearing seat respectively. The bearing seat is fixed on the stander by bolts.

The oblique blade roller includes regularly configured rotary blades. The oblique angle between the oblique blade roller and the tractor advancing direction (V) is between 55~70°. The tips of the rotary blade are bending toward tilled soil (or rightward soil).

A column of side force balance blades, whose moving planes are paralleled to the rotation plane of the tractor driving wheel is equipped on the left end of the oblique blade roller. The angle between the rotating center axis of the side force balance blades and the oblique blade roller is between 20~35°, and the rotating axis of the side force balance blades is paralleled to the driving shaft of the tractor.

In one aspect, the working of the oblique blade roller is oblique submerged reverse rotary tilling, namely the oblique blade roller shaft is located below 5~10 cm to the soil surface, and the rotating direction is the inverse rotating direction of the driving wheel when the tractor is advancing.

In another aspect, the oblique bearing seat is fixed at the end of the oblique blade roller shaft, further, the oblique bearing seat is fixed with the stander using bolts and the oblique bearing seat has an inner groove paralleled to the driving wheel, further, the cylindrical roller bearing is fixed in the inner groove of the oblique bearing seat and the outer ring of the cylindrical roller bearing is equipped in the oblique bearing seat, further, the steel ball seat is configured on the oblique blade roller shaft and matched with the inner ring of the cylindrical roller bearing, further, the side force balance blades are fixed on the cutter head and the cutter head is fixed on the steel ball seat, further, a groove, where the steel balls are installed in, is cut in the oblique blade roller shaft and configured between the steel ball seat and the oblique blade roller shaft.

In another aspect, the steel ball seat is fitted to the inner ring of the cylindrical roller bearing by an interference fit and the outer ring of the cylindrical roller bearing is fit to the oblique bearing seat by an interference fit.

In another aspect, the number of the side force balance blades is 4~6.

In another aspect, the side force balance blades are side-cutting blades, and their side-cutting planes include a cutting-edge I and a cutting-edge II.

In another aspect, the cutting-edge I adopts Descartes Ray curve, and the cutting-edge II adopts the Weibull Distribution curve in which size, the shape, and position parameters are $\alpha=1$, $0.5<\beta<1$, $\gamma=0$ respectively.

In another aspect, the distance between adjacent rotary blade cutter head is 100~150 mm, and each cutter head installed on 2~3 rotary blades, The phase angle of the rotary blade mounted on the same adjacent cutter head is 60~90°.

In another aspect, the length, blade thickness, the lengthwise portion width and the positive section width are 150~250 mm, 8~10 mm, 15~20 mm, and 80~120 mm, respectively.

The working process of the present invention is as follows:

The power of the tractor is transmitted to the gearbox through the universal joint, and then the power output shaft of the gearbox drives the oblique blade roller to rotate inversely and cut soil from plow-sole. Meanwhile, the rotation center of the oblique blade roller is located below 5-10 cm to the soil surface, and the rotating direction is the inverse rotating direction of the tractor driving wheel. Since the oblique blade roller is configured obliquely to the tractor forwarding speed in the horizontal plane, the rotating plane of rotary blades and the forward direction of the tractor form an angle. So, rotary blades have a component velocity along the axial direction of the oblique blade roller when it is cutting soil, making more soil clods destroyed by pulling force.

The oblique blade roller is mainly made up of configured rotary blades whose tips bend to the same direction. The angle between the rotary tilling blade roller and the tractor advancing direction (V) is 55~70°, and the rotary blade tips are all toward the right side of the tractor advancing direction (V). Side force balance blades are installed to the left side of the oblique blade roller and used to balance the axial component force of the oblique blade roller. The working pattern of this invention is an oblique submerged reverse rotary tillage method, so there is no soil restriction on the top of the tilling soil clod. Meanwhile, due to cutting soil configured regularly, the right-side soil has been cut when the rotary blades soil begins tilling. The soil is mainly destroyed by tension force. Since rotary blades have axial component speed, tilled soil clods will be destroyed mainly by rightward pulling force applied by rotary blades, and the tilled soil clods are mainly thrown to cultivated land. The rotary blades reduce a constraint surface when they cut soil but the right first-row rotary blades. The cutting soil starts from the plow-sole, and more soil is broken by tension force. The device has not only the characteristics of deep plowing, and also has a good effect of soil crushing, stable operation, low power consumption, but also makes more cut soil clods thrown to the tilled farmland, reducing re-tillage and energy consumption. In addition, the oblique blade roller can cut the soil beneath the gearbox and the bearing seat. So, the device can avoid the lower edges of the gearbox, and the bearing seat is interfering with the uncultivated land, making gearbox, bearing seat and a knife roller shaft easy to sink below the ground to achieve deep tillage.

A groove is cut on the left side of the knife roller shaft, attaching a steel ball. One part of the steel ball is fitted in this groove; the other part is fitted in the steel ball seat on the left side of the oblique blade roller. The steel ball seat is fixed with the cutter head by bolts. Side force balance blades are configured in the cutter head, and the side force balance blades rotating plane is paralleled to that of the tractor driving wheel. The knife roller shaft makes the steel ball seat rotate through the steel ball transmission, and the steel ball drives side force balance blades to rotate. The side force balance blades cannot only cut soil but also be used to balance the axial force of knife roller.

The present invention has advantages and positive effects as follows:

Since the angle between the oblique blade roller and the tractor advancing direction is 55~70°, the rotary blades cut soil with a component velocity along the axis of the knife roller. So, the present invention can make more soil destroyed by tension force than other rotary tillers. Rotary blades are installed on the cutter shaft, and their tips are all bending rightward, so they can cut soil regularly. In other words, the cutting soil clods reduce a rightward constraint face when they are tilling but those tilled by rotary blades configured in the first row. Thus, the soil can be more easily tilled, and consequently save tilling energy. A list of side force balance blades is configured on the left side of the oblique blade roller, and the rotating axis of the side force balance blades and the oblique blade roller have an angle 20~35°. The rotating axis of the side force balance blades is paralleled to the tractor driving wheel axis. Therefore, the side force balance blades can not only be used to cut the soil, but also be used to balance the axial force of the knife roller. The operating mode of the device is an oblique submerged reverse rotary tillage. The soil clods are cut start from plow-sole, and more soil clods are broken by tension force. The device has not only the characteristics of deep plowing but also has good effects of breaking soil, stable operation and low power consumption. Meanwhile, more tilled soil clods are thrown to the tilled farmland than those tilled by other submerged reverse rotary tillers. Thus, the present invention can reduce re-tillage and energy consumption. In addition, the oblique blade roller can cut the soil under the gearbox and the bearing seat, so the device can avoid the gearbox and the bearing seat interfering with untilled soil, making the gearbox, the bearing seat and the knife roller shaft easy to sink below the ground surface and consequently realize deep rotary tilling using short rotary tilling blades. The device has simple and compact structure.

IV. DESCRIPTION OF DRAWINGS

In the figures: 1—stander; 2—mounted frame; 3—gearbox; 4—bearing seat; 5—oblique blade roller; 6—rotary blade; 7—oblique blade roller shaft; 8—steel ball; 9—steel ball seat; 10—cutter head; 11—uncultivated land; 12—cut slice; 13—ground surface; 14—cultivated land; 15—soil particle; 16—side force balance blades; 17—output shaft; 18—bearing; 19—cutting-edge I; 20—cutting-edge II; 21—oblique bearing seat; 22—cylindrical roller bearing; 23—tractor; 24—tractor power output shaft (power take-off shaft, or PTO); 25—power input shaft; and 26—universal joint.

V. EMBODIMENTS

Further to the drawings as well as specific examples presented below, but the scope of the invention is not limited to this.

Figure 1:
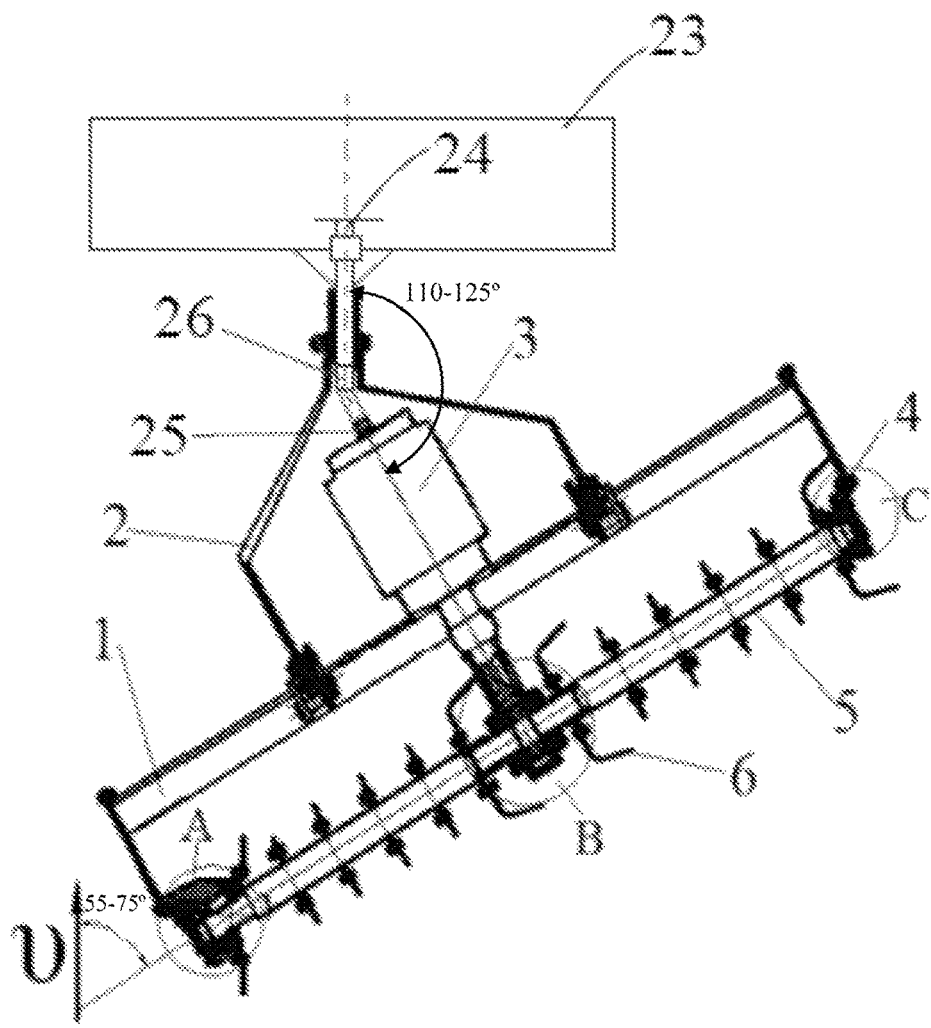
FIG. 1 illustrates the schematic diagram of the structure of the present invention.
Figure 3:
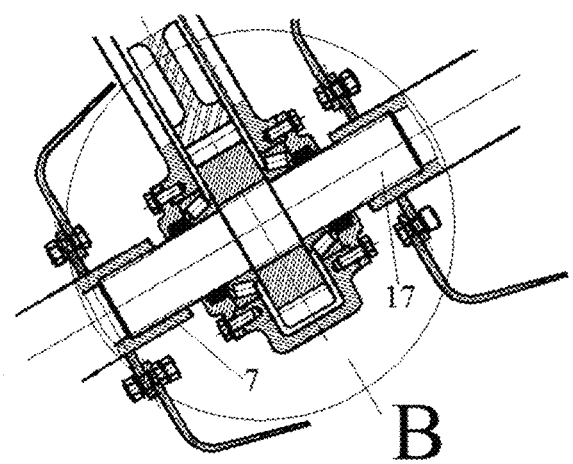
FIG. 3 illustrates the local enlarging graphs of the B section shown in FIG. 1.
Figure 4:
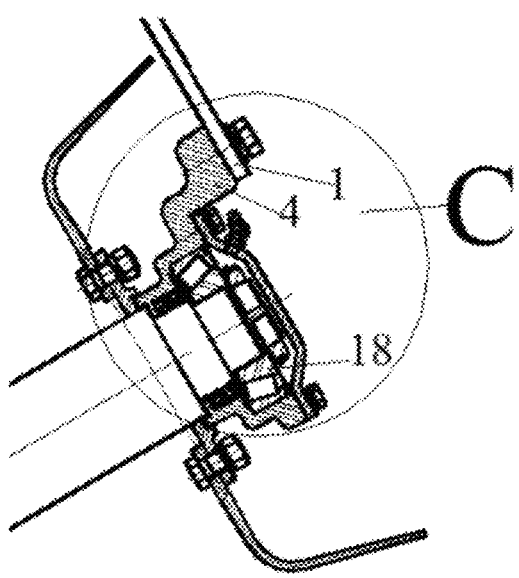
FIG. 4 illustrates the local enlarging graphs of the C section shown in FIG. 1.

As shown in FIG. 1, FIG. 3 and FIG. 4, the oblique submerged reverse deep rotary tilling device of the invention includes a stander 1, a mounted frame 2, a gearbox 3 and an oblique blade roller 5. The oblique submerged reverse deep rotary tilling device is connected to a the tractor 23 through a mounted frame 2, and the mounted frame 2 is connected to the frame 1. The gearbox 3 is positioned at the center of the device, and the power output shaft 24 of the tractor 23 drives the power input shaft 25 of the gearbox 3 through a universal joint 26. The power output shaft 17 of the gearbox 3 is a splined shaft, and both ends of the power output shaft 17 are respectively connected with one end of the oblique blade roller shaft 7 on both ends. And the other end of the oblique cutter roller shaft 7 is configured in the bearing 18 located in the bearing seat 4, and the bearing seat 4 is fixed on the frame 1 by bolts. The power output shaft 17 of the gearbox 3 drives the oblique blade roller 5 on both ends to reversely rotate and cut soil.

Figure 2:
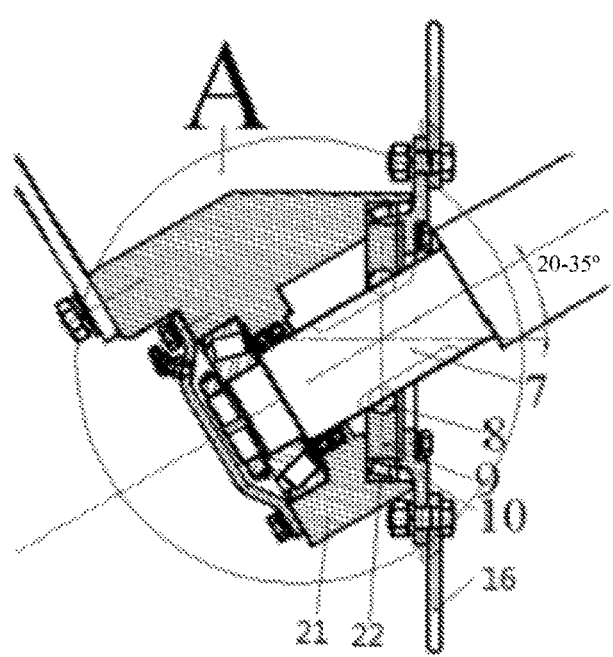
FIG. 2 illustrates the local enlarging graphs of the A section shown in FIG. 1.

As shown in FIG. 1 and FIG. 2, the oblique blade roller 5 is made up of the rotary blades 6 whose tips are bending rightward, and the oblique angle between the oblique blade roller 5 and the advancing direction of the tractor is 55~70°, and the rotary blade 6 tips are all bent rightward. However, the left side of oblique knife roller 5 is configured a column of side force balance blades 16, and the oblique angle between the rotating center axis of the side force balance blades 16, the oblique blade roller 5 is 20~35°, and the rotating center axis of the side force balance blades 16 is parallel to the driving wheel shaft of the tractor.

As shown in FIG. 2, the oblique blade roller shaft 7 has a groove, and a steel ball 8 is fitted between the groove and the steel ball seat 9 of the side force balance blade 16 on the left side of the oblique blade roller 5. The steel ball seat 9 is connected with the cutter head 10 through bolts, and the cutter head 10 is equipped the side force balancing blades 16. The steel ball seat 9 is connected to the inner ring of the cylindrical roller bearing 22 by pinch fit, and the outer ring of the cylindrical roller bearing 22 is connected to the oblique bearing seat 21 by pinch fit. The oblique bearing seat 21 is fixed with the stander 1 by bolts. When the oblique blade roller shaft 7 rotates, the steel ball 8 drives the steel ball seat 9 to rotate, and the steel ball 8 rolls back and forth in the groove in the left of the oblique blade roller shaft 7. The steel ball seat 9 drives the inner ring of the cylindrical roller bearing 22 to rotate. Because the outer ring of the cylindrical roller bearing 22 is fixed with the oblique bearing seat 21, the side force balance blade 16 is rotated to cut soil in the plane which parallels to the tractor wheel.

Figure 5:
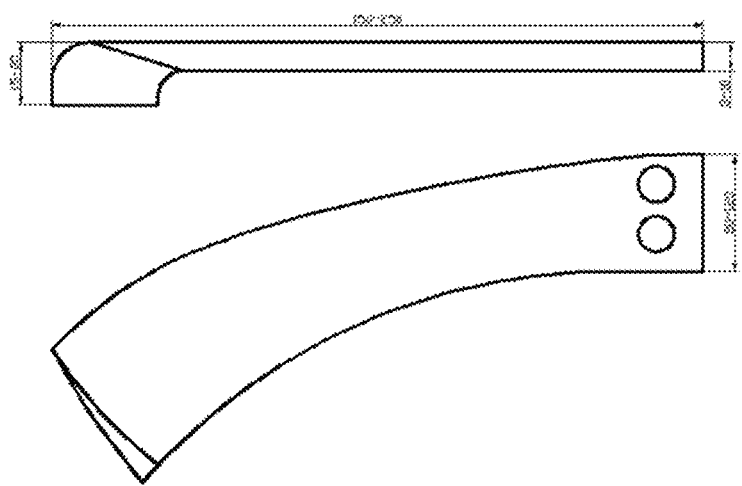
FIG. 5 illustrates a schematic diagram of rotary blade.

As shown in FIG. 5, the rotary blade 6 is specifically designed for the invention. The length of the rotary blade 6 is 150~250 mm, blade thickness is 8~10 mm, the widthwise section width is 15~20 mm, and the lengthwise section width is 80~120 mm. The lengthwise section area of the rotary blade 6 is enlarged, and the widthwise section area is decreased, which can reduce the amount of soil thrown forward and increase the amount of soil thrown backward.

Figure 6:
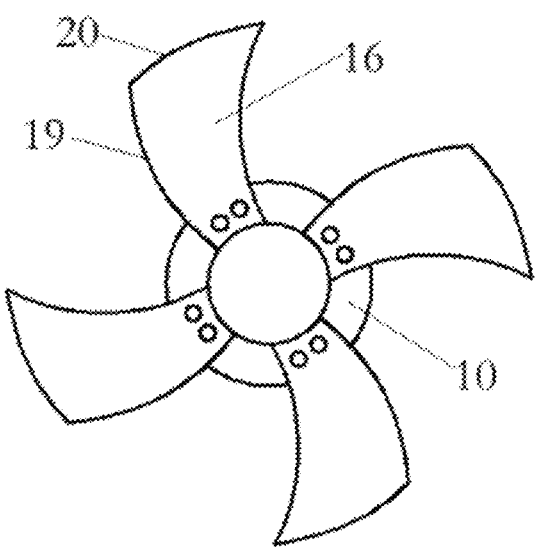
FIG. 6 illustrates the schematic diagram of the side force balance knife.

As shown in FIG. 6, the number of the side force balance blades 16 installed on the left side of the oblique blade roller 5 is 4~6. The lateral area of the side force balance blades 16 is relatively larger, and the side force balance blades 16 has a cutting-edge I 19 and a cutting-edge II 20. The cutting-edge I 19 adopts Descartes Ray curve, and the cutting-edge II 20 adopts the structure of Weibull Distribution curve in which size, the shape, and position parameters are $\alpha=1$, $0.5<\beta<1$, $\gamma=0$ respectively. In the cutting soil process, the relatively larger lateral area is more effective to balance the axial force of the knife roller.

Figure 7:
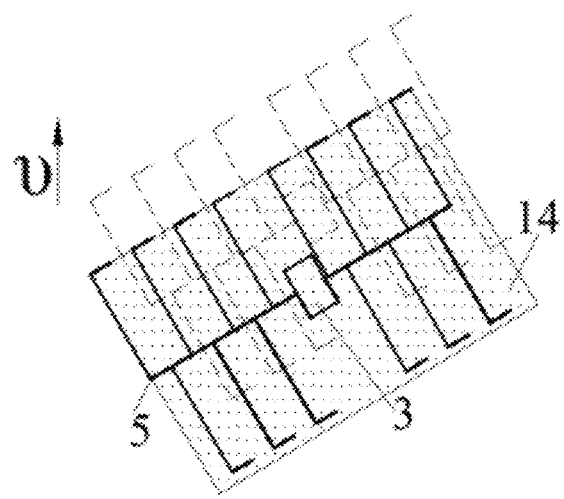
FIG. 7 illustrates the schematic diagram of the working of the present invention.

As shown in FIG. 7, the gearbox 3 of the dotted area located in the farming area of the solid line when the oblique blade roller 5 moves from solid line area to the dotted area. Namely, the gearbox 3 is located on cultivated land 14 then. So, the device can avoid the gearbox 3 interference with uncultivated land 11, and make the oblique blade roller shaft 7 sinks into the ground surface to achieve deep tillage.

Figure 8:
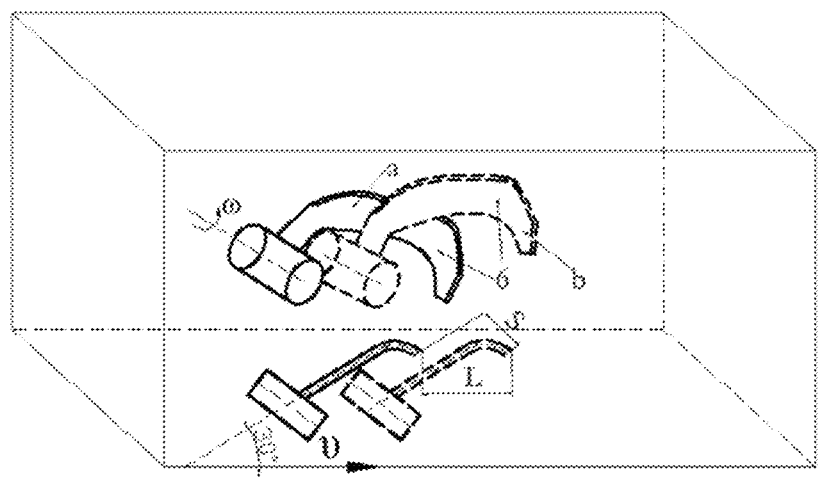
FIG. 8 illustrates the schematic diagram of rotary blade cutting soil movement of the present invention.

As shown in FIG. 8, when the rotary blade 6 moves from position "a" to the position "b", the rotary blade 6 not only moves forward L but also moves rightward S. So, the rotary blade 6 has a movement of pointing to the cultivated land 14 and makes more soil destroyed by tension force, consequently reducing cutting soil force. It also makes the cut slice 12 get a speed of pointing to the cultivated land 14, and make tilled soil clods thrown to the cultivated land 14, reducing re-tilling.

Figure 9:
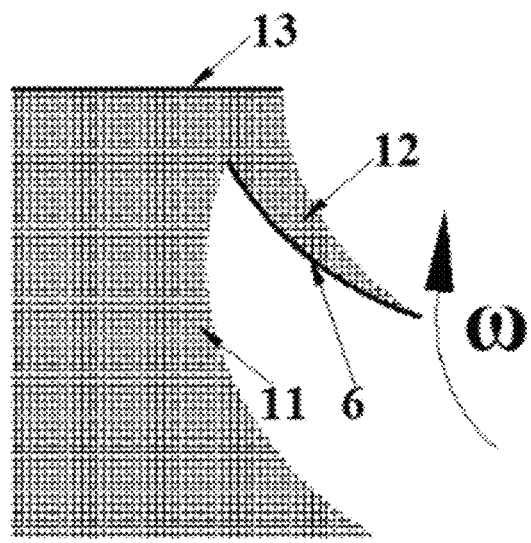
FIG. 9 illustrates the schematic diagram of the cutting soil of the present invention.

As shown in FIG. 9, the operating mode of the present invention is oblique submerged reverse rotary tillage. The soil is cut from the plow-sole. Because the cut slice 12 has no constraint above, more soil can be broken by tension and be thrown to cultivated land 14. So, it can reduce the amount of hipping in the front.

Figure 10:
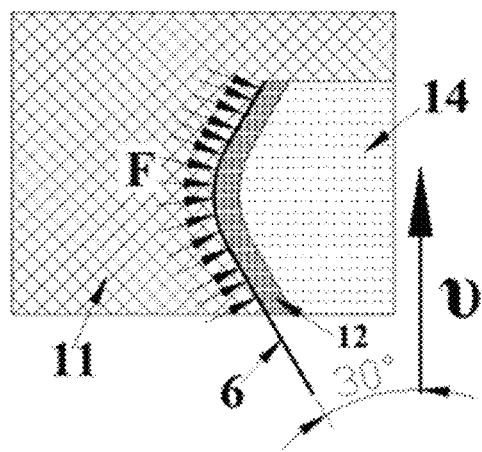
FIG. 10 illustrates the schematic diagram of rotary blade effect on soil of the present invention.

As shown in FIG. 10, the right of the rotary blade 6 is cultivated land 14, so cut slice 12 reduces a constraint surface. That will reduce the cutting force, and make the soil damaged more easily, and reduce the energy consumption of cutting soil. Because the angle between the side edge of rotary blade 6 and forward direction is 20~35°, the side edge of rotary blade 6 with lateral displacement produces forces on the cut slice 12, and the force direction is shown in the figure. Since the right of the cut slice 12 is cultivated land 14, more soil may be broken by tension. So, the invention can reduce the energy consumption.

Figure 11:
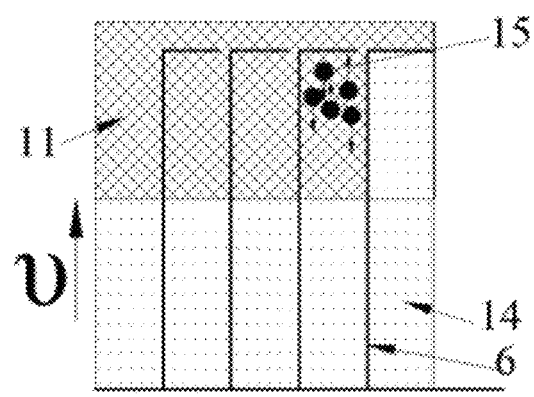
FIG. 11 illustrates the natural submerged reverse rotary direction of soil throwing device.
Figure 12:
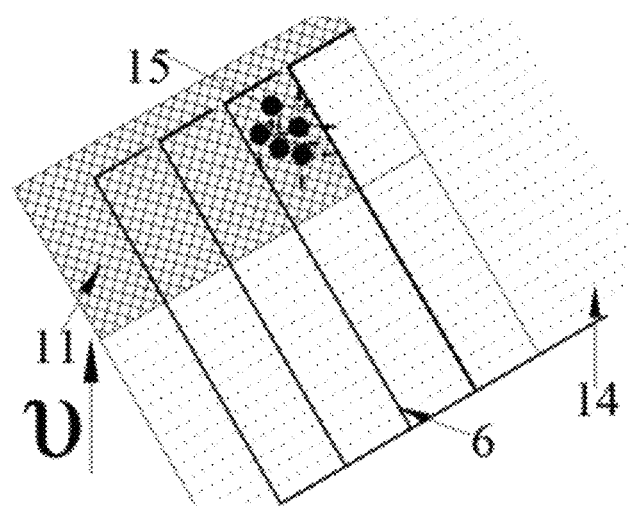
FIG. 12 illustrates the diagram of throwing soil of the present invention.

As shown in FIG. 11 and FIG. 12, the throwing direction of the soil particles 15 is as shown in FIG. 11 when using natural submerged reverse rotary tillage device. Most soil particles are thrown to the front of the device, causing blockage and increasing farming energy consumption. However, the throwing direction of the soil particles 15 is as shown in FIG. 12 when using oblique submerged reverse rotary tillage device of the present invention. In addition to the soil particles 15 thrown to the forward or backward, more soil particles 15 are thrown to the cultivated land 14. So, the invention may make more soil be thrown to the cultivated land 14, and reduce the amount of hipping, and further reduce re-tillage and energy consumption.

In addition, the object of the present invention is to create an embodiment and has been described in detail, the present invention is provided only for the creation of a preferred embodiment, and cannot consider defining the scope of the present inventions. Where the scope of such an application under these inventions made in equal changes and modifications shall yet fall within the present inventions covered by the patent. Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. An oblique submerged reverse deep rotary tilling device configured to be connected to a tractor (23), the device comprising: a stander (1), a mounted frame (2), a gearbox (3) and an oblique blade roller (5) connected to the stander (10), wherein:
   the mounted frame (2) is connected to the stander (10) to orient the oblique blade roller (5) at an angle of 55 to 70° to an advancing direction (V) of the tractor (23);
   the gearbox (3) is located at a center of the stander (1);
   the gearbox (3) has a power input shaft (25) configured to be linked with a power take-off (PTO) shaft (24) of the tractor (23) by a universal joint (26) so that the power input shaft (25) is at an angle of 110 to 125° to the advancing direction (V) of the tractor (23);
   the gearbox (3) has a power output shaft (17) that is a splined shaft connected to an oblique blade roller shaft (7) of the oblique blade roller (5);
   the oblique blade roller (5) has rotary blades (6) and the oblique blade roller shaft (7) has oppositely-disposed first and second ends connected to bearings (18) supported by bearing seats (4,21) fixed on oppositely-disposed ends the stander (1), the first end of the oblique blade roller shaft (7) being behind the second end of the oblique blade roller shaft (7) in the advancing direction (V) as a result of the mounted frame (2) orienting the oblique blade roller (5) at the angle of 55 to 70° to the advancing direction (V);
   tips of the rotary blades (6) are bent toward the second end of the oblique blade roller shaft (7); and
   a column of side force balance blades (16) are mounted to the oblique blade roller (5) and rotate in a plane that is parallel to the advancing direction (V), and the side force balance blades (16) have a rotating center axis disposed at an angle of 20 to 35° to the oblique blade roller (5).

2. The device of claim 1, wherein the oblique blade roller shaft (7) has a rotating direction that is inverse to a rotating direction of a driving wheel of the tractor (23) when the tractor (23) is advancing in the advancing direction (V).

3. The device of claim 1, wherein the bearing seat (21) fixed at the first end of the oblique blade roller shaft (7) is an oblique bearing seat (21) that has an inner groove paralleled to the advancing direction (V), a cylindrical roller bearing (22) having an inner ring and an outer ring is fixed in the inner groove of the oblique bearing seat (21), the oblique blade roller shaft (7) has a groove matched with a ball seat (9) of the inner ring of the cylindrical roller bearing (22), balls (8) are disposed between the groove in the oblique blade roller shaft (7) and the ball seat (9) of the inner ring of the cylindrical roller bearing (22), and the side force balance blades (16) are fixed on a cutter head (10) fixed on the outer ring of the cylindrical roller bearing (22).

4. The device of claim 3, wherein the ball seat (9) is fitted to the inner ring of the cylindrical roller bearing (22) by an interference fit, and the outer ring of the cylindrical roller bearing (22) is fitted to the oblique bearing seat (21) by an interference fit.

5. The device of claim 4, wherein the number of the side force balance blades (16) is four, five, or six.

6. The device of claim 5, wherein the side force balance blades (16) are side-cutting blades each comprising a first cutting edge (19) and a second cutting edge (20).

7. The device of claim 6, wherein the first cutting edge (19) adopts a Descartes Ray curve, and the second cutting edge (20) adopts a Weibull Distribution curve in which size, shape and position parameters are $\alpha=1$, $0.5<\beta<1$, $\gamma=0$ respectively.

8. The device of claim 7, wherein the rotary blades (6) of the oblique blade roller (5) extend from cutter heads that are spaced apart 100 to 150 mm, two or three rotary blades (6) extend from each of the cutting heads, and the rotary blades (6) of each of the cutting heads have a phase angle of 60 to 90°.

9. The device of claim 1, wherein the length, blade thickness, the lengthwise portion width, and the positive section width are 150 to 250 mm, 8 to 10 mm, 15 to 20 mm, and 80 to 120 mm, respectively.

* * * * *